March 4, 1958 G. M. EDDY 2,825,381
TIRE CHAIN
Filed Oct. 3, 1956 2 Sheets-Sheet 1
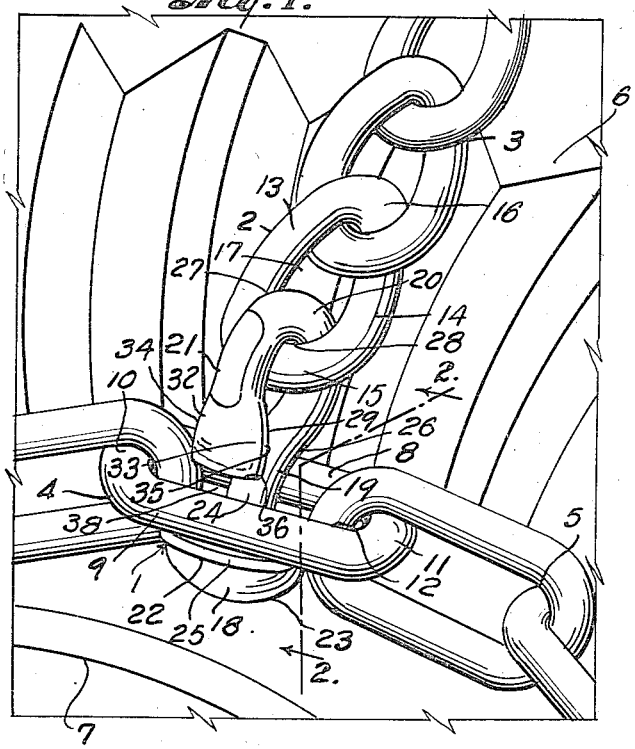
INVENTOR.
Glen M. Eddy
BY
Paul E. Mullendore
ATTORNEY March 4, 1958 G. M. EDDY 2,825,381
TIRE CHAIN
Filed Oct. 3, 1956 2 Sheets-Sheet 2
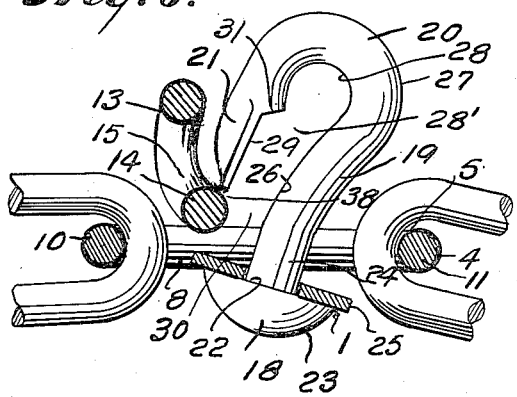
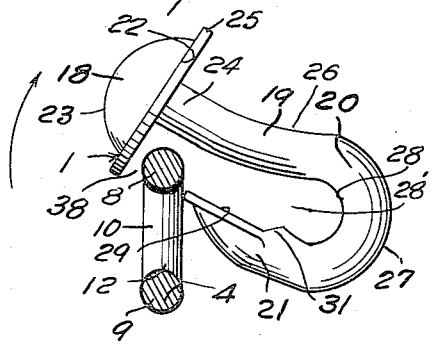
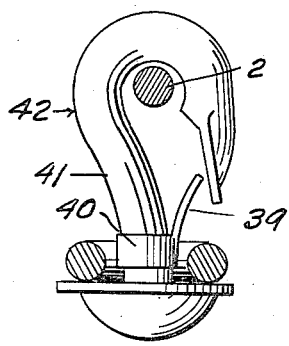
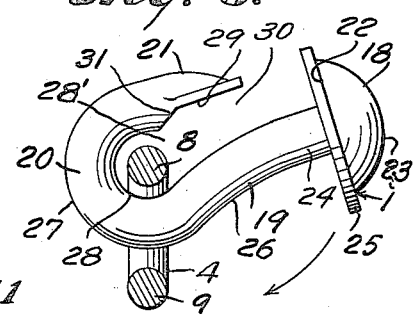
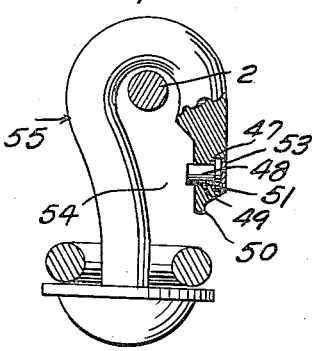
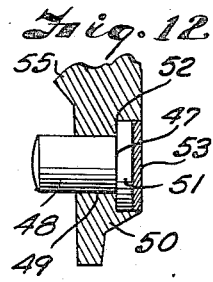
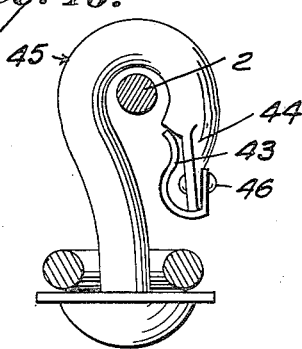
INVENTOR.
Glen M. Eddy
BY
Paul E. Mullendore
ATTORNEY

United States Patent Office 2,825,381
Patented Mar. 4, 1958

2,825,381

TIRE CHAIN

Glen M. Eddy, Kansas City, Kans.

Application October 3, 1956, Serial No. 613,777

5 Claims. (Cl. 152—241)

This invention relates to tire chains of the type having cross chains swivelly connected with side chains, the present application being a continuation-in-part of my copending application Serial No. 524,100, filed July 25, 1955, and now abandoned. Chains of this character are desirable and have proved satisfactory as antiskid devices, however, the swivel connections as heretofore provided are complicated, add to the weight of the chain where weight is a critical factor, and they do not stand up under heavy equipment and on rocky roads.

Therefore, the principal objects of the present invention are to provide a swivel connection of simple light weight construction in that it consists of a novel hook member, which swivels directly in a link of the side chain and hooks into the end link of the cross chain.

A further object of the invention is to provide a chain construction in which the cross chains may be applied without the use of tools and yet connections cannot shake or fall apart when the chains are handled.

It is also an object of the invention to provide a swivel hook having a shape to cooperate with the size and shape of the links to form an interlock between the parts and thereby prevent disconnection of the parts when the chains have been removed from a tire.

A further object of the invention is to provide a tire chain with swivel connections that are practicable for heavy duty use on industrial machines such as tractors, trucks, snow plows, road grading machines, mobile mining equipment and the like.

It is also an object of the invention to provide a swivel connection in the form of a hook wherein the terminal portion of the hook is provided with a resilient keeper to further cooperate with the shape of the hook in maintaining connection of the hook with the link of the side chains.

In accomplishing these and other objects of the invention I have provided improved structure, the preferred forms of which are illustrated in the accompanying drawings wherein:

Fig. 1 is a perspective view of a portion of a side chain and one end of a cross link of a tire chain connected together by a swivel hook embodying the features of the present invention.

Fig. 2 is a fragmentary section through the side chain on the line 2—2 of Fig. 1 and showing the swivel hook connecting the end link of the cross chain to a link of the side chain.

Fig. 3 is a fragmentary side perspective view showing that the end link of the cross chain cannot be removed or dropped from the hook when the cross chains are turned to the side as they usually do when the assembled chain is applied to a tire.

Fig. 4 is a similar view but showing the end link keying of the link even when it assumes a position over the entrance to the swivel hook.

Fig. 5 is a section similar to Fig. 2, but showing the swivel hook and end link of the cross chain in the one relative position where the cross chain can be removed and replaced on the swivel hook.

Fig. 6 is a longitudinal section through the side chain and endmost cross link and showing the swivel hook tilted in the link of the side chain and the end link of the cross chain being freed from the swivel hook.

Fig. 7 shows the first step in applying the swivel hook to a link of the side chain.

Fig. 8 is a view similar to Fig. 7 but showing the swivel hook being threaded through a link of the side chain.

Fig. 9 is a section through a link of the side chain and end link of the cross chain showing the swivel connection including a hook having a resilient keeper attached to the shank of the hook to prevent accidental disconnection.

Fig. 10 is a similar view of a further modified form of the invention showing the resilient keeper carried by the terminal of the hook.

Fig. 11 is a similar view of a further modified form of the invention showing the keeper formed of a resilient insert.

Fig. 12 is an enlarged section of the terminal end of the hook of Fig. 11, and better illustrating the attachment of the keeper.

Referring more in detail to the drawings, and first to the preferred form of invention shown in Figs. 1 to 8, inclusive:

The numeral 1 designates a preferred form of swivel hook constructed in accordance with the present invention for connecting the end link 2 of a cross chain 3 with links 4 of the side chain 5 of a tire chain that is adapted to be mounted on the tire 6 of a wheel 7. Fig. 1 of the drawing shows only one end of a cross chain 3 and a portion of a side chain 5. However, it is to be understood that the complete antiskid chain includes a swivel hook 1 connected with a side chain 5 at the opposite side of the tire and that the complete antiskid chain includes a plurality of circumferentially spaced cross chains 3 extending across the tread of the tire and which have their end links 2 connected to the side chains in a like manner.

The links 4 of the side chains 5 are elongated and comprise parallel spaced apart bar portions 8 and 9 connected by substantially semicircular end portions 10 and 11 whereby the links have elongated openings 12 in which the end portions 10 and 11 of adjacent links turn. The links 4 are formed of wire stock of circular cross section bent to shape with ends welded together preferably in the center of one of the side bars 8 or 9. The links 4 of the side chains 5 are coupled together incidental to forming and welding thereof so the circular end portion 10 of one link freely engages within the circular end portion 11 of the next adjacent link in the chain.

The cross chains 3 also include a plurality of links 2 in which the side bar portions 13 and 14 are connected by semicircular end portions 15 and 16 and are provided with a twist whereby the end portion 15 is positioned at substantially right angles with respect to the other end portion 16 and the bar portions 15 and 16 cross each other in spaced apart relation. The side bar portions are relatively straight and are of a length so that the openings 17 through the links are elongated. The inner curvature of the ends of the link 2 are of larger diameter than the diameter of the cross section of the end portions 15 and 16 of the links whereby the rounded end of one link has free swiveling connection within the rounded end of the connecting link. The links when connected give a generally circular overall cross section to the cross chains 3 so that they can roll on the tread of the tire 6 and present different surfaces to the road whereby the cross chains 3 wear substantially evenly about their axis of rotation.

Each of the swivel hooks has a particular form whereby the body of the hook cooperates with the links of the chain to maintain connection of the swivel hooks with the chain and also provide for ready connection and disconnection of the cross chains when replacing or adjusting the number and spacing of the cross links about a tire, either when the chains are on or off a tire, as later to be described.

The swivel hooks 1 each include a head 18, a shank portion 19, a hook portion 20, and a terminal portion 21. The head 18 has a substantially flat annular shoulder 22 encircling the shank portion 19 and the shoulder 22 is of preferably larger diameter than the transverse width of the elongated openings 12 of the links 4 of the side chains 5 whereby opposite diametrical sides of the head lap the side bar portions 10 and 11 of a link 4 to prevent pulling the head 18 of the swivel hook through the link. The exterior side of the head 18 is rounded as at 23 in the manner of a rivet. The shank portion 19 has a relatively short portion 24 thereof coaxial with the head 18 and which has a diameter to fit freely between the side bar portions 8 and 9. The portion 24, however, is of sufficient length to extend through a side link 4 and to accommodate a washer 25 under the head 18. The shank portion continues into the hook portion 20, with a gradual curvature as at 26, which reverses in a semicircular curve 27 to provide the hook portion 20, the center thereof being substantially in the extended axis of the shank portion 19 of the hook, or at least only slightly offset to said extended axis. The inner diameter of the hook portion 20 is slightly larger than the cross sectional diameter of the end portions 15 or 16 of the end links 2 of the cross chains 3 to provide a substantially semicircular seat 28 therefor. The terminal portion 21 continues from the hook portion 20 in the direction of the head 18, generally on an axis parallel with a tangent of the curvature of the seat 28 to provide a pass 28' into the seat of the hook. The terminal portion 21 at the inside, that is, the side facing the shank portion 19, has a flat face 29 spaced from the shank portion, as indicated at 30, to pass a side 15 or 16 of an end link 3 into the semicircular seat 28. In order to allow sufficient width of the pass 30, the flat face 29 is offset outwardly as at 31, the offset being provided by deforming the metal to provide the flat face 29. The sides 32 and 33 of the terminal portion flare outwardly on reverse curves 34 and 35 whereby the width of the end edge 36 of the terminal portion is greater than the transverse width of the openings 17 of an endmost link 2 of a cross chain 3, as shown in Fig. 4. The end edge 36 of the terminal portion is preferably arcuate across the width thereof, as shown in Figs. 3, 4 and 5, and is spaced from the annular shoulder of the head a critical distance. That is, when the swivel hook 1 is pulled up snugly with respect to the side bars of a side link, with the head 18 bearing upon the washer 25 and the washer 25 against the side bars 8 and 9, an end link of the side chain 3 cannot be passed through the space 38 then existing between the plane of the side bar portions 8 and 9 and the end edge 36 of the hook. This provides a safeguard to assure retention of the links in the hooks when the chains are in use on a tire.

The washer 25 is preferably provided to give a more extensive contact with the link 4 and to control the effective space 38 when the swivel hook is turned to the position shown in Fig. 6 for placement and removal of the cross chain 3, as later described.

The modified forms of swivel hook shown in Figs. 9 to 11 have yieldable keepers that are depressed to permit passage of a link 2 when the link 2 is forced thereagainst by sufficient pressure to overcome the spring action of the keeper. The action may be easily effected by pressure of the fingers and without use of tools.

The keeper shown in Fig. 9 includes a spring leaf 39 that is carried by a collar 40 on the shank 41 of the hook 42.

The keeper shown in Fig. 10 is also a spring leaf 43 attached to the terminal 44 of the hook 45 by a rivet 46.

The keeper shown in Figs. 11 and 12 is a resilient plug 47, preferably a synthetic rubber plug having a stem portion 48 extending through a hole 49 (Fig. 12) in the terminal 50 and which has a head 51 retained in a counterbore 52 on the outer side thereof by a disk 53 that is pressed into the open end of the counterbore 52 to keep the end of the stem 48 projecting into the pass 54 of the swivel hook 55.

In assembling an antiskid chain constructed as described, the side chains 5 may be cut to desired length from standard chain having the links 4 of the shape described. The cross chains 3 may also be cut from standard twisted chain having links 2 of the form described.

To facilitate manufacture of the swivel hooks they are preferably forged from what is known as rivet stock, which have the heads already formed and shanks of sufficient length to provide the shank, hook and terminal portions 19, 20 and 21. The washer 25 is threaded on the shank before the shank is provided with the bends 26 and 27 and prior to shaping of the terminal 21. After application of the washer, the bend 26 and reverse bend 27 are formed and the terminal 21 is shaped to provide the offset face 29 and the widely spaced side portions 34 and 35, whereby the end of the terminal is wider than the transverse dimension of the openings 17 in the links 2 of the cross chains.

The present structure, therefore, allows the large chain users to purchase the side and cross chains in bulk, so that they may be cut to length for the various sizes of tires with which their vehicles may be equipped. The swivel hooks 1 may be purchased in quantities independently of the chain, because the hooks may be applied to the side chains 5 and connected with the cross chains 3 without the use of tools.

In applying the swivel hooks 1 to the side chains 5, the swivel hooks 1 are turned with the hook portions transversely of the links with the terminals 21 thereof in position to pass through the long way of the openings 12 of the appropriate links 4, as shown in Fig. 7. After the terminals 21 have passed through the openings 12 of the links, the bar portions 8 or 9 are shifted through the spaces 30 and passes 28' into the seats 28. The swivel hooks are then moved in a clockwise direction, as indicated by the arrows, Figs. 7 and 8, to a position where the shank portions 19 may be shifted through the openings 12 of the side links 4 to bring the washers 25 into engagement with the side bar portions 8 and 9 of the links 4. The swivel hooks 1 may thus be applied in various spacing around the circumference of the side chains 5, according to the desire of the user.

The cross chains 3 are also readily applied to the swivel hooks 1 without the use of tools. This is effected by turning the swivel hooks 1 with the shank portions 19 rotating within the openings 12 of the side chains to bring the hook portions 20 thereof into the longitudinal direction of the links 4, as shown in Fig. 6. This is required because in all other positions of the swivel hooks, there is insufficient room between the links 4 and the edges 36 for the end links 2 of the cross chains 3 to pass therethrough. However, in the position shown in Fig. 6, the swivel hooks may be tilted retractively in the longitudinal direction of the link until the washers 25 engage the bar portions 8 and 9, as shown in Fig. 6. This allows for the edge portions 36 of the swivel hooks to move away from the side bars 8 and 9 of the side links a sufficient distance for the spaces 38 to open up, whereby that portion of the end link 2 between the rounding end and side bar portions, for example 15 and 13, will pass through the spaces 38. As stated, this increase in the spaces 38 is effected because the arcuate portion of the washer intermediate the bar portions of the link move into the opening therebetween, as shown in Fig. 6. The arcuate portion of the link 2 also enters the space from the opposite direction, as also shown in Fig. 6. Then by turning the link 2 just after it has passed the widened terminal portion 21 of the swivel hook, the curved end portion of the link can be passed under the edge 36 and into the seat 28 and in which position the cross chain is keyed from displacement after the swivel hook has been turned so that the hook portion thereof extends transversely of the link of the side chain. In this position no part of the end link can pass through the space 38. The parts are thus keyed together so that the antiskid chains may be applied and removed from the tire substantially without any likelihood of the cross chains being disengaged from the hook portions of the swivel hooks. As long as the cross links 2 are connected with the hook portions of the swivel hooks, they provide a key so that it is impossible for the swivel hooks to pass through the opening 12 of the side links in any direction in which the swivel hooks may be turned.

In case a resilient keeper is used, as shown in Figs. 9 and 10, the bar portions of the links 2 are pressed through the entrance of the hook 42 or 45 to depress the keeper 39 or 43 far enough to open the pass so as to permit passage of the bar portions of the links. As soon as the bar portions of the links slip by the tongue portions of the keepers, the tongues spring back to their original position for retaining the hooks within the openings 12 of the respective links 4.

The end links 2 of the cross chains, when moved through the passes, likewise depress the spring tongues of the keepers sufficiently to permit passage thereof into the seat portions of the swivel hooks. After the links pass the tongues, the tongues spring back to their original position and retain the end links of the cross chain in connection with the swivel hooks.

In the form of the invention shown in Figs. 11 and 12, the end links 2 are passed into the hooks and the projecting portions 48 of the resilient plugs 47 yield sufficiently for the links to pass, after which they spring back into position to retain the parts in assembly.

The tire chains, constructed and assembled as described, are applied to a tire 6 in the manner of a conventional tire chain and the ends of the side chains are interconnected by any fastener. The fastener is not shown for the reason that a connector forms no part of the present invention.

In service, the cross chains 3 may roll and adjust themselves on the tire 6 with the shanks 19 of the swivel hooks turning within the openings 12 of the links 4.

The swivel hooks have very little wear and may be useable over long periods of time without replacement, however, the cross chains, which are subjected to wear, may be easily removed and replaced either when the chain is on or off the tire. By carrying a few extra cross chains in the tool box, worn out cross chains may be replaced on the road.

From the foregoing, it is obvious that I have provided a tire chain equipped with swivel hooks which are of simple and inexpensive construction and which, with the exception of the washer, consists of a single part that is sufficiently strong to withstand the heavy duty necessary for antiskid devices when used on industrial machines, such as tractors, trucks, snow plows, road grading machines, mobile mining equipment, and the like.

It is also obvious that the connections between the cross chains and side chains are easily made without the use of tools.

What I claim and desire to secure by Letters Patent is:

1. In a tire chain having a side chain composed of interconnected elongated side links each having side bar portions of circular cross section and rounding end portions forming elongated openings through the links and a cross chain having an elongated end link composed of rounding end portions and side bar portions of circular cross section to provide an elongated opening through said end link, a hook for removable connection with one of the side links and for removably connecting said end link of the cross chain with the side chain, and which hook comprises a head of larger diameter than the width of the opening in the side link, a shank portion of circular cross section extending from said head, a hook portion extending from the shank portion and having a terminal offset from the shank portion and spaced from said head a distance greater than the diameter of said circular cross section of said bar portions of the side link but less than the combined diameters of the circular cross sections of said side and end links to provide space therebetween, said terminal of the hook having a width greater than the width of the openings in said links but less than the length of said openings to pass through the opening of the side link when the hook is inserted through the opening of the side link to bring the shank of the hook into said opening, said shank of the hook being adapted to turn and tilt within said opening to provide space between said terminal portion of the hook and the side bar portions of the side link for passing one of the side bar portions of the end link of the cross chain into said hook for retention therein when the hook is turned within the opening of the side link and said end link of the cross chain is turned so that the width of the terminal is transversely of the width of the end link and said space between the terminal of the hook and an adjacent side bar portion of the side link is sufficiently filled by said side bar portion of the side link to retain said end link of the cross chain in said hook portion.

2. In a tire chain having a side chain composed of interconnected elongated side links each having side bar portions of circular cross section and rounding end portions forming elongated openings through the links and a cross chain having an elongated end link composed of rounding end portions and side bar portions of circular cross section to provide an elongated opening through said end link, a hook for removable connection with one of the side links and for removably connecting said end link of the cross chain with the side chain, and which hook comprises a head of larger diameter than the width of the opening in the side link, a shank portion of circular cross section extending from said head, a washer on said shank portion and adapted to seat against said head, a hook portion extending from the shank portion and having a terminal offset from the shank portion and spaced from said washer a distance greater than the diameter of said circular cross section of said bar portions of the side link but less than the combined diameters of the circular cross sections of said side and end links to provide space therebetween, said terminal of the hook having a width greater than the width of the openings in said links but less than the length of said openings to pass through the opening of the side link when the hook is inserted through the opening of the side link to bring the shank of the hook into said opening and the washer into contact with a side of said side link, said shank of the hook being adapted to turn and tilt within said opening to provide space between said terminal portion of the hook and the side bar portions of the side link for passing one of the side bar portions of the end link of the cross chain into said hook for retention therein when the hook is turned within the opening of the side link and said end link of the cross chain is turned so that the width of the terminal is transversely of the width of the end link and said space between the terminal of the hook and an adjacent side bar portion of the side link is sufficiently filled by said side bar portion of the side link to retain said end link of the cross chain in said hook portion.

3. In a tire chain having a side chain composed of interconnected elongated side links each having side bar portions of circular cross section and rounding end portions forming elongated openings through the links and a cross chain having an elongated end link composed of rounding end portions and side bar portions of circular cross section with the rounding end portions at substantially right angles to each other and the side bar portions in spaced apart crossing relation to provide an elongated opening through said end link, a hook for removable connection with one of the side links and for removably connecting said end link of the cross chain with the side chain, and which hook comprises a head of larger diameter than the width of the opening in the side link, a shank portion of circular cross section extending from said head, a washer on said shank portion and adapted to seat against said head, a hook portion extending from the shank portion and having a terminal offset from the shank portion and spaced from said washer a distance greater than the diameter of said circular cross section of the side link but less than the combined diameters of the circular cross sections of said side and end links to provide space therebetween, said terminal of the hook having a width greater than the width of the openings in said links but less than the length of said openings to pass through the opening of the side link when the hook is inserted through the opening of the side link to bring the shank of the hook into said opening and the washer into contact with a side of said side link, said shank of the hook being adapted to turn and tilt within said opening to provide space between said terminal portion of the hook and the side bar portions of the side link for passing one of the side bar portions of the end link of the cross chain into said hook for retention therein when the hook is turned within the opening of the side link and said end link of the cross chain is turned so that the width of the terminal is transversely of the width of the end link and said space between the terminal of the hook and an adjacent side bar portion of the side link is sufficiently filled by said side bar portion to retain said end link of the cross chain in said hook portion.

4. A hook as described in claim 1 and having a resilient member extending partially across the space between the terminal of the hook and said shank portion to further the retention of the end link in said hook.

5. A hook as described in claim 3 and having a resilient member extending partially across the space between the terminal of the hook and said shank portion to further the retention of the end link in said hook.

References Cited in the file of this patent
UNITED STATES PATENTS

| | | |
|---|---|---|
| 404,659 | Sears | June 4, 1889 |
| 1,817,547 | Eddy | Aug. 4, 1931 |
| 2,415,583 | Eddy | Feb. 11, 1947 |